United States Patent
Grothe et al.

(10) Patent No.: US 7,332,111 B2
(45) Date of Patent: Feb. 19, 2008

(54) DEVICES AND METHODS FOR THE PRODUCTION OF PARTICLES

(75) Inventors: Willy Grothe, Boulder, CO (US);
Daniel Jarmer, Boulder, CO (US);
Corinne Lengsfeld, Denver, CO (US);
Theodore Randolph, Niwot, CO (US)

(73) Assignee: The Regents of the University of Colorado, Boulder, CO (US)

( * ) Notice: Subject to any disclaimer, the term of this patent is extended or adjusted under 35 U.S.C. 154(b) by 325 days.

(21) Appl. No.: 10/483,194

(22) PCT Filed: Jul. 10, 2002

(86) PCT No.: PCT/US02/22300

§ 371 (c)(1),
(2), (4) Date: Sep. 13, 2004

(87) PCT Pub. No.: WO03/006223

PCT Pub. Date: Jan. 23, 2003

(65) Prior Publication Data

US 2005/0051917 A1 Mar. 10, 2005

Related U.S. Application Data

(60) Provisional application No. 60/304,227, filed on Jul. 10, 2001.

(51) Int. Cl.
*B29B 9/00* (2006.01)

(52) U.S. Cl. .............................. 264/11; 264/5; 264/13; 264/14; 425/6

(58) Field of Classification Search ...................... None
See application file for complete search history.

(56) References Cited

U.S. PATENT DOCUMENTS 5,639,441 A 6/1997 Sievers et al. ............... 424/9.3

(Continued)

FOREIGN PATENT DOCUMENTS

EP 0 388 927 A1 9/1990

(Continued)

OTHER PUBLICATIONS

Bayvel, L. and Orzechowski, Z. (1993) *Liquid Atomization*, Taylor and Francis, Washington, D.C., pp. 172-194.

(Continued)

*Primary Examiner*—Mary Lynn Theisen
(74) *Attorney, Agent, or Firm*—Lathrop & Gage LC

(57) ABSTRACT

The present invention provides methods and devices for producing particles with an average diameter less than about 15 μm using the precipitation with compressed fluid-antisolvent (PCA) process and the carbon-dioxide assisted nebulization with a bubble dryer (CAN-BD) process. In the methods and nozzles of the invention, at least one jet of supercritical or near-supercritical fluid and at least one jet of solution interact to mix the supercritical or near-supercritical fluid and the solution within a chamber. The solution contains at least one solvent and at least one solute. At least one of the jets is a swirling jet. To form particles, the solvent and supercritical or near-supercritical fluid are then injected into a PCA or a CAN-BD process chamber. The degree of mixing depends in part on the power input into the mixing chamber. Power inputs of about $6.5 \times 10^9$ W/m$^3$ enhance the degree of mixing and allow production of nanoscale particles with the PCA process. The nanoscale particles have a size distribution so that polydispersity is less than about 1.75.

26 Claims, 10 Drawing Sheets

U.S. PATENT DOCUMENTS

| | | | |
|---|---|---|---|
| 5,707,634 A | 1/1998 | Schmitt | 424/400 |
| 5,766,522 A | 6/1998 | Daley et al. | 246/13 |
| 5,795,594 A | 8/1998 | York et al. | 424/489 |
| 5,833,891 A | 11/1998 | Subramaniam et al. | 264/7 |
| 5,851,453 A | 12/1998 | Hanna et al. | 264/5 |
| 5,855,786 A | 1/1999 | Eggers et al. | |
| 5,874,029 A | 2/1999 | Subramaniam et al. | 264/12 |
| 6,063,138 A | 5/2000 | Hanna et al. | 23/295 |
| 6,095,134 A | 8/2000 | Sievers et al. | 128/200.14 |
| 6,403,672 B1 | 6/2002 | Randolph et al. | 522/79 |
| 2002/0000681 A1 | 1/2002 | Gupta et al. | 264/9 |
| 2002/0073511 A1 | 6/2002 | Hanna et al. | 23/295 |

FOREIGN PATENT DOCUMENTS

| | | |
|---|---|---|
| EP | 0 677 332 A3 | 10/1996 |
| GB | 2322326 | 8/1998 |
| GB | 2334900 | 9/1999 |
| WO | WO98/36825 | 8/1998 |
| WO | WO01/03821 | 1/2001 |

OTHER PUBLICATIONS

Bernhardt, A. (Nov. 2001), "Optimization of Gas-like Mixing for Controlled PCA Production of Micro- and Nano-particles," Annual AIChE Meeting, Reno, NV, Nov. 3-9, 2001, Abstract Only.

Bodemeier et al. (1995), "Polymeric Microspheres Prepared by Spraying into Compressed Carbon Dioxide," Pharm. Res. 12:1211-1217.

Bristow et al. (Nov. 2001), "Analysis of the supersaturation and precipitation process with supercritical $CO_2$," J. Supercrit. Fluids 21:257-271.

Chattopadhyay and Gupta (Jul. 2001), "Production of Antibiotic Nanoparticles Using Supercritical $CO_2$ as Antisolvent with Enhanced Mass Transfer," Ind. Eng. Chem. Res. 40:3530-3539.

Coulson, J.M. et al. (1996) Chemical Engineering, vol. 1, $5^{th}$ ed., Butterworth-Heineman, Oxford, England p. 261.

Delavin, Inc., "A Total Look at Oil Burner Nozzles," (1969).

Desai, M.P. et al. (1996), "Gastrointestinal Uptake of Biodegradable Microparticles: Effect of Particle Size," Pharm. Res. 13:1838-1845.

Dixon, D.J. et al. (1993), "Polymeric Materials Formed by Precipitation with a Compressed Fluid Antisolvent," AIChE J. 39:127-139.

Falk et al. (1997), "Controlled release of ionic compounds from poly (L-lactide) microspheres produced by precipitation with a compressed antisolvent," J. Controlled Rel. 44:77-85.

Fox, R.W. and McDonald, A. (1992) Introduction to Fluid Mechanics, $4^{th}$ Edition, John Wiley and Sons, p. 347.

Hirst, P.H. et al. (Mar. 2002), "In Vivo Lung Deposition of Hollow Porous Particles from a Pressurized Metered Dose Inhaler," Pharm. Res. 19:258-264.

Jarmer, D.J. et al. (2002), "Using precipitation kinetics to manipulate nanoscale particle size distributions during precipitation with a compressed-fluid antisolvent," Annual AIChE Meeting, Indianapolis, IN, Nov. 3-8, 2002.

Jarmer, D.J. et al. (2002), "A jet-swirl nozzle design for manipulating particle size and size distribution of poly (L-lactic acid) (PLA) at the nano scale in the precipitation with a compressed-fluid antisolvent (PCA) process," American Association of Pharmaceutical Scientists Drug Delivery Conference, Arlington, VA, Apr. 2002, Abstract Only.

Jarmer, D.J. et al. (2001), "Precipitation with a Compressed Antisolvent (PCA) Production of Biodegradable Nanoparticles," Macromolecular Drug Delivery Conference, Breckenridge, CO, Jul. 11-14, 2001, Abstract Only.

Jarmer, D. J. et al. (2001), "Precipitation with a Compressed Antisolvent Production of Biodegradable Nanoparticles," $43^{rd}$ Rocky Mountain Conference on Analytical Chemistry, Denver, CO, Jul. 29-Aug. 2, 2001, Abstract Only.

Jarmer, D.J. et al. (2002), "A Jet-Swirl Nozzle Design for Producing Nanoscale Polymer Particles in the Supercritical Fluid Antisolvent Process," Particles 2002, Orlando, FL, Apr. 20-23, 2002, Abstract Only.

Jarmer, D.J. et al. (2002), "Jet-swirl Nozzle Design for Producing Nanoscale Polymer Particles in the Supercritical Antisolvent Process," $15^{th}$ Annual Conference on Liquid Atomization and Spray Systems, Madison, WI, May 14-17, 2002.

Jarmer, D.J. et al. (Dec. 2003), "Manipulation of particle size distribution of poly(L-lactic acid) nanoparticles with a jet-swirl nozzle during precipitation with a compressed antisolvent," J. Supercritical Fluids 27:317-336.

Johnson, R.K. et al. (1996), "Electrostatic-Enhanced Atomization for Spray Drying of Milk," Lebensim.-Wis. u.-Technol. 29:71-81.

Jung, J. and Perrut, M. (Jun. 2001), "Particle design using supercritical fluids: Literature and patent survey," J. Supercrit. Fluids 20:179-219.

Kuntz, R.M. and Saltzman, W.M. (1997), "Polymeric controlled delivery for immunization," Trends Biotechnol. 15:364-369.

Langer, R. (1993), "Polymer-Controlled Drug Delivery Systems," Acc. Chem. Res. 26:537-542.

Lefebvre, A.H. (1989) Atomization and Sprays, Hemisphere Publishing Corp., Bristol, PA, pp. 29-36, 112-118, 165-189.

Lengsfeld et al. (Mar. 2000), "Mechanism Governing Microparticle Morphology during Precipitation by a Compressed Antisolvent: Atomization vs. Nucleation and Growth," J. Phys. Chem. B 104:2725-2735.

Leurox et al. (1996), "Biodegradable nanoparticles—From sustained release formulations to improved site specific drug delivery," J. Controlled Rel. 39:339-350.

Matson, D.W. et al. (1987), "Raid Expansion of Supercritical Fluid Solutions: Solute Formation of Powders, Thin Films, and Fibers," Ind. Eng. Chem. Res. 26:2298-2306.

Mawson et al. (1997), "Coaxial Nozzle for Control of Particle Morphology in Precipitation with a Compressed Fluid Antisolvent," J. Appl. Polym. Sci. 64:2105-2118.

Randolph, T.W. et al. (1993), "Sub-Micrometer-Sized Biodegradable Particles of Poly(L-Lactic Acid) via the Gas Antisolvent Spray Precipitation Process," Biotechnol. Prog. 9:429-435.

Reverchon, E. et al. (Oct. 2000), "Supercritical antisolvent micronization of some biopolymers," J. Supercrit. Fluids 18:239-245.

Shekunov, B.Y. et al. (1999), "Crystallization process in turbulent supercritical flows," J. Cryst. Growth 198/199:1345-1351.

Shekunov, B.Y. et al. (Apr. 2001), "Particle formation by mixing with supercritical antisolvent at high Reynolds numbers," Chem. Eng. Sci. 56:2421-2433.

Subramaniam, R.A. et al. (1997), "Pharmaceutical Processing with Supercritical Carbon Dioxide," J. Pharm. Sci. 86:885-890.

Thies, J. and Muller, B.W. (1998), "Size controlled production of biodegradable microparticles with supercritical gases," Eur. J. Pharm. Biopharm. 45:67-74.

Werling, J.O. and Debenedetti, P.G. (Aug. 2000), "Numerical modeling of mass transferin the supercritical antisolvent process: miscible conditions," J. Supercrit. Fluids 18:11-24.

European Patent Office, Supplementary European Search Report, Dec. 10, 2004.

DEVICES AND METHODS FOR THE PRODUCTION OF PARTICLES

CROSS-REFERENCE TO RELATED APPLICATIONS

This application is the National Stage of International Application No. PCT/US02/22300, filed Jul. 10, 2002, which claims the benefit of U.S. Provisional Application No. 60/304,227, filed Jul. 10, 2001.

STATEMENT REGARDING FEDERALLY SPONSORED RESEARCH OR DEVELOPMENT

This application was made at least in part with government support under National Institutes of Health grant HL59400-03. The United States government has certain rights in this invention.

BACKGROUND OF THE INVENTION

This invention is in the field of particles having an average diameter less than about 15 microns, and in particular is directed to methods and devices for making particles using the precipitation with compressed-fluid antisolvent (PCA) process and the carbon-dioxide assisted nebulization with a bubble dryer (CAN-BD) process.

Dry powder formulations with a controlled particle size and size distribution have many applications in the field of pharmaceutical drug delivery, especially in the areas of pulmonary delivery, controlled release, and needle-less powder injections. These formulations require precise control of particle size and size distribution. For example, pulmonary dosage forms of solid particles require particle diameters of about 1-3 µm in order to effectively target regions of the deep lung (J. Heyder et al. (1986) J. Aerosol Sci. 5:811). There has been considerable interest in developing polymeric nanoparticles (about 1-100 nm) that allow for targeted drug delivery to particular organs and tissues because they exhibit biodistribution profiles that are different from those of microparticles (greater than about 1 micron). For example, Desai et al. found the efficiency of uptake of 100 nm-sized poly (l-lactide-co-glycolide) particles by intestinal tissue was 15-250 fold higher compared to that for 1-10 µm sized particles (M. P. Desai et al (1996) Pharm. Res. 13:1838). Research in developing biodegradable polymeric nanoparticles has received attention because of their applications in controlled release formulations, as carriers for DNA in gene therapy, and their ability to deliver proteins, genes, and vaccines through a peroral route of administration (J. C Leurox, et al. (1996) J. Controlled Release 39:339; R. M. Kuntz, W. M. Saltzman, (1997) Trends Biotechnol, 15:364).

Traditional techniques for the production of micrometer and sub-micrometer particles include mechanical comminution (e.g., grinding and milling), recrystallization of solutes from solution using liquid antisolvents, double emulsion/evaporation processes, freeze drying and spray drying (B. Subramaniam, R. A. et al (1997) J. Pharm. Sci. 86:885). However these techniques have limitations that include excessive solvent use, thermal and chemical degradation of the solute, large residual solvent concentrations, and difficulties in controlling particle size and size distribution during processing. These limitations may affect powder stability, flow properties, and delivery efficiency (P. H. Hirst, et al. (2002) Pharm. Res. 19:258). Overall, the production of monodisperse powders with a controlled particle size in the micro/nanoscale remains challenging.

To address the shortcomings of traditional processing methods, supercritical fluid precipitation technologies that use supercritical carbon dioxide as an antisolvent have been investigated as a means for producing particulates. Supercritical fluids offer distinct advantages as antisolvents for precipitation. By adjusting both the temperature and pressure the physical properties of the supercritical fluid such as density, viscosity, and diffusivity can be readily varied. Favorable mass transfer characteristics, defined by a low viscosity and high diffusivity relative to liquids, offer the capability of producing monodisperse powders with low residual solvent concentrations. Supercritical carbon dioxide, by far the most common supercritical antisolvent, has a relatively low critical temperature (304.1 K) and pressure (7.38 MPa), low toxicity, and is inexpensive.

Precipitation with a compressed-fluid antisolvent (PCA) is a method that is capable of producing micrometer and sub-micrometer sized powders in a single-stage, scalable process. Under the conditions typically used in PCA processing, a solute is dissolved in an organic solvent and the resulting solution is injected into, or mixed with, a supercritical fluid antisolvent. Typically, the method involves the use of a particle formation chamber containing compressed fluid antisolvent. The operating temperature and pressure are selected so the supercritical fluid is completely miscible with the organic solvent. Due to the very rapid two-way mass transfer in supercritical fluid mixtures (i.e. solvent diffusing into the supercritical fluid and the supercritical fluid diffusing into the solvent) high degrees of supersaturation of the solute occur and the solute precipitates.

Past PCA research and development has focused on using jet hydrodynamics and liquid atomization theory as a guide for manipulating and controlling particle size during the PCA process. The Weber number, a ratio of inertial to surface tension forces, may be used to estimate droplet sizes in different atomization spray configurations (A. H. Lefebvre, Atomization and Sprays, Hemisphere Publishing Corp., Bristol, Pa., 1989). Liquid atomization theory predicts that larger Weber numbers will yield more intense atomization and hence smaller liquid droplet diameters. Smaller liquid droplets allow for an increase in the two-way mass transfer rates between the solvent/antisolvent, resulting in larger nucleation rates and smaller particles. With this theory as a guide, attempts have been made to control polymer particle size and size distribution (D. J. Dixon et al. (1993) AiChE J. 39:127; R. Bodemeier et al (1995) Pharm. Res. 12:1211; but only a weak variation in size with flow rate or Reynolds number was observed. In addition, various process parameters such as temperature, pressure, solute concentration, and solvent/solute flow rate have been manipulated to adjust particle size, but the results show there is a limited range in polymer size variation when these process parameters are varied. Overall, manipulation of particle size distributions has proved difficult using conventional PCA mixing configurations.

More recent research suggests that gaseous mixing theory and mixing rates, or rather, mixing length scales for turbulent mixing, should be used as a guide for manipulating and controlling particle size during the PCA process. Lengsfeld et al. (2000) J. Phys. Chem B, 104:2725) recently explored the validity of the assumption that liquid atomization controls the size of particles produced in the PCA process. They demonstrated that surface tension for jets of miscible fluids injected into critical and near-critical solvents is reduced to negligible levels over timescales shorter than the characteristic jet breakup time, and that distinct droplets never form. Studies by Werling et al. (J. O. Werling, P. G. Debenedetti (2000) J. Supercrit. Fluids 18:11) and Bristow et al. (2001) J. Supercrit. Fluids 21:257) also show that for supercritical conditions, where the solvent and antisolvent are completely miscible, there is no well-defined droplet interface that is stabilized by surface tension. Based on these results, liquid atomization theory and Weber number based analysis are no longer considered the appropriate theory and parameter to characterize the process. Instead, gaseous mixing theory and mixing rates, or rather, mixing length scales for turbulent mixing, should be used to characterize sprays of miscible fluids (B. Y. Shekunov et al. (1999) J. Crystal Growth 198/199:1345).

Various methods for mixing the solution and compressed antisolvent have been used. In one set of methods the solution is injected into a chamber of compressed antisolvent, and mixing between the two fluids occurs within the particle formation chamber. The solvent may be sprayed through a capillary tube (or capillary nozzle) directly into the chamber (Dixon et al. (1993), Materials, Interfaces, and Electrical Phenomena, 39(1), 127-139). Particle sizes obtained using this method are on the order of 0.1-5 microns. The solution may also be sprayed through a capillary tube onto a horn which is vibrated at ultrasonic frequencies. (Chattopadhyay and Gupta (2001), Ind. Eng. Chem. Res., 40, 3530-3539). In the later process, termed "SAS-EM", mixing is carried out in the bulk of the particle formation chamber. The ultrasonic field generated by the horn surface is said to enhance turbulence and mixing within the supercritical phase, resulting in high mass transfer between the solution and the antisolvent and smaller particles (100-500 nm). The polydispersity of the particles reported was about 1.4 at a volume average particle size of 1100 nm and decreased to about 1.1 at a volume average particle size of 125 nm. However, the ultrasonic horns are expensive and have a limited life time at high pressure. Furthermore, heat is an unknown and uncontrolled variable. Heat may degrade molecules and affect the precipitation kinetics in the process as described. Furthermore, this process has not been demonstrated for polymer particles.

The solution may also be co-introduced with a flow of antisolvent into the chamber of compressed antisolvent. The flow of antisolvent generates additional mixing of antisolvent and solvent. Typically, the solution and antisolvent are introduced coaxially through a coaxial nozzle. The velocities of the two flows can be manipulated independently and the antisolvent flow velocity is typically greater than that of the solvent. (Mawson et al. (1997) 64, 2105-2118). The solution can also be co-introduced with a flow of antisolvent through ultrasonic spray nozzles (Falk et al., (1997), J. Controlled Release, 44, 77-85; Randolph, T. W. et al., (1993), Biotechnology Progress, 9, 429-435).

In some coaxial nozzle designs, mixing between the solution and the antisolvent does not occur within the nozzle. For example, Mawson et al. (1997, supra) show a coaxial nozzle having an inner nozzle tube which extends beyond an outer nozzle tube. The inner tube carries the solvent while the outer tube carries the antisolvent.

Other coaxial nozzle designs do provide some mixing of the solution and the antisolvent within the nozzle. U.S. Pat. No. 5,851,453 to Hanna et al., issued Dec. 22, 1998 describes a coaxial nozzle in which the outer nozzle passage extends beyond the inner nozzle passage. The ends of both nozzle passages are tapered. In this configuration some mixing of the solvent and antisolvent can occur within the nozzle before the fluids pass into the main chamber of the PCA apparatus. The mean particle sizes demonstrated are greater than one micron. Yu et al. ((2001), Chem. Eng. Sci., 56, 2421-2433) describe a coaxial nozzle consisting of two tubes (for internal solution and external $CO_2$ flows) opening into a small premixing chamber. Although Yu et al. (2001) show a decrease in the mean particle diameter with an increase in the Reynolds number, the particles are not nanosized. Instead, the smallest mean particle diameter discussed appears to be about 5 microns in diameter. The size distribution of the particles does not appear to be reported, but the SEM photos of the smaller particles show clear size differences. The authors state that large-scale inhomogeneity may still exist in the flow through the nozzle.

Another type of nozzle design for co-introduction of antisolvent and solution mixes two antisolvent flows and a solution within a chamber inside the nozzle (WO 98/35825, Hanna and York, published Aug. 27, 1998). In one embodiment, the nozzle provides a first fluid inlet means for the introduction into the chamber of a first supercritical fluid and a solution and second fluid inlet means for introducing simultaneously an impinging flow of the second supercritical fluid at an angle to, and directed at, the direction of flow of the first supercritical fluid. In a "cross-flow" nozzle, the two supercritical fluids were opposing (angle between the supercritical fluids of 180°). The first inlet means preferably has two or more concentric passages through which may be introduced a flow of the first supercritical fluid and a flow of the solution (i.e. the first inlet means preferably is a coaxial nozzle). Nozzle configurations are also described in which the solution is introduced at an angle to the flow of the first supercritical fluid, so long as it is then dispersed by the supercritical fluid(s) immediately as it comes into contact with them. In particular, a configuration is shown where the solution is introduced perpendicular to that of two counter-current supercritical fluid flows. A cross-flow nozzle was demonstrated to produce particles in the size range 200-750 nm for a variety of materials. For nicotinic acid, it was claimed that the size distribution of (particles was narrowed compared to particles produced with a conventional coaxial nozzle.

Carbon Dioxide-Assisted Nebulization with a Bubble Dryer (CAN-BD) is another particle formation method that is capable of producing powders less than about 6.5 microns in diameter. Under the conditions typically used in CAN-BD processing, a solute is dissolved in an aqueous solvent and the resulting solution is mixed with a supercritical fluid. In contrast to the PCA process, in the CAN-BD process the solvent is either insoluble or partially soluble in the supercritical fluid and the supercritical fluid is partially soluble in the aqueous solvent. The particles are formed through rapidly expanding the mixture into a region in which the temperature and pressure are below the critical temperature and pressure of the supercritical fluid. The rapid decompression of the supercritical fluid, coupled with the explosive release of dissolved supercritical fluid in the aqueous solution, acts to atomize the aqueous solution and produce an aerosol. This aerosol is directed into a stream of co-flowing heated gas (typically air or nitrogen), and particle formation results due to evaporation of the solvent. Solvent evaporation from droplets occurs in a plume that extends from the injection nozzle. The length of this plume is important for equipment design, as the plume must not impinge on any surfaces or vessel walls before evaporation is complete, or else severe agglomeration of wet particles may result. The size of this plume may be minimized by efficiently mixing the supercritical fluid with the aqueous solvent in a fashion so that the concentration of supercritical fluid dissolved in the aqueous phase immediately before expansion into the drying chamber is as high as possible. Sievers et al. (U.S. Pat. No. 5,639,441, issued Jun. 17, 1997) discloses a mixing tee with a dead volume less than about 10 μl for mixing the supercritical fluid and solvent.

There remains a need in the art for improved methods and devices for producing particles with an average diameter less than 15 microns, preferably particles with an average diameter less than 1 micron. Furthermore, there remains a need in the art for particles with a controlled particle size. Preferably the particles have a narrow size distribution, with a polydispersity less than about 1.75. Although nanoscale particles have been made using the PCA and CAN-BD processes, the resulting particle size distributions have not always been optimal.

SUMMARY OF THE INVENTION

The present invention provides methods and devices for producing particles with an average diameter of less than about 15 microns. The particles can be produced using the PCA process or by using the CAN-BD process. Particles produced using the PCA process can be made with an average diameter less than about 1 micron and with a polydispersity of less than about 1.75.

The invention provides an apparatus for forming particles with an average diameter less than about 15 microns comprising: a particle formation chamber capable of maintaining a selected temperature and pressure; and a nozzle for introduction into the particle formation chamber of a first fluid and a second fluid, the nozzle having an axis, wherein both the fluids flow through the nozzle so that each fluid has a component of flow parallel to the nozzle axis and the first fluid is selected from the group consisting of a supercritical and a near-supercritical fluid, and the second fluid is a solution comprising a solvent and at least one solute; and wherein the nozzle comprises a mixing chamber having interior walls; at least a first and a second inlet to the mixing chamber; and at least one outlet from the mixing chamber, wherein at least the first inlet is a swirl inlet which is not parallel to the nozzle axis and the walls of the mixing chamber converge towards the outlet in the vicinity of the outlet.

The nozzle creates at least two jets within the mixing chamber, wherein at least one of the jets is a swirling jet. Because of the swirling jet, swirling flow occurs within the mixing chamber which generates a rapidly expanding flow upon exit from the mixing chamber, which in turn acts to reduce particle growth by agglomeration. Either the solution or supercritical or near-supercritical fluid can swirl, or both fluids can swirl. In one configuration, the nozzle has at least one axial inlet to the mixing chamber which is parallel to the longitudinal axis of the nozzle and at least one swirl inlet which has an angle with respect to the longitudinal axis of less than 90°.

The invention provides a method for producing particles comprising the steps of mixing a first fluid and a second fluid, wherein mixing occurs through interaction of at least one first fluid jet and at least one second fluid jet in the mixing chamber and least one of the jets is a swirling jet; and spraying the mixed fluids through an outlet into the chamber of an apparatus for forming particles, wherein the first fluid is selected from the group consisting of a supercritical and a near-supercritical fluid and the second fluid is a solution comprising a solvent and at least one solute. The apparatus for forming particles may be configured as a PCA-type apparatus or a CAN-BD-type apparatus.

The interaction of the jets within the mixing chamber contributes to mixing of the solution and the supercritical or near-supercritical fluid within the chamber. The mixing within the chamber can be characterized by the energy for mixing inside the mixing chamber, or power input. In the methods of the invention, it is preferred that the power input into the nozzle is above about $6.5 \times 10^9$ W/m$^3$.

DETAILED DESCRIPTION OF THE INVENTION

Figure 1B:
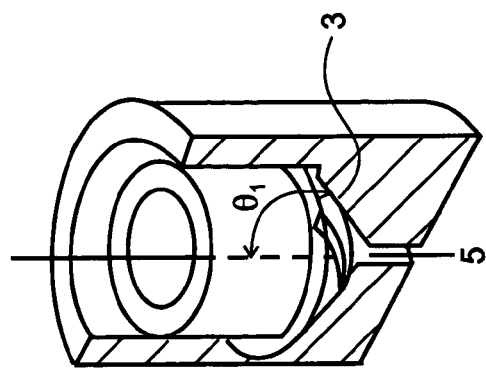
FIGS. 1A-1C schematically illustrate a nozzle of the invention.

The invention provides an apparatus for forming particles with an average diameter less than about 15 microns comprising: a particle formation chamber capable of maintaining a selected temperature and pressure; and a nozzle for introduction into the particle formation chamber of a first fluid and a second fluid. The nozzle has an axis and both the fluids flow through the nozzle so that each fluid has a component of flow parallel to the nozzle axis. The nozzle comprises a mixing chamber having interior walls; at least a first and a second inlet to the mixing chamber; and at least one outlet from the mixing chamber, wherein the first inlet is a swirl inlet which is not parallel to the axis, and the walls of the mixing chamber converge towards the outlet in the vicinity of the outlet. The first fluid is selected from the group consisting of a supercritical and a near-supercritical fluid. The second fluid is a solution comprising a solvent and at least one solute. The apparatus for particle formation can be either a PCA or a CAN-BD apparatus.

As used herein, a "particle" can be composed of almost any solid material which can be dissolved or carried in a solvent. Operable solids include for example, a polymer, a pharmaceutical, agricultural chemical, commercial chemical, fine chemical, food item, photographic chemical, dye, explosive, paint, or cosmetic.

As used herein, "polymer" includes copolymers. "Copolymers" are polymers formed of more than one polymer precursor. The polymer particles of the invention may be linear or cross-linked. "Linear polymers" are those polymers that are composed of individual polymer chains that do not have bonds connecting the chains. "Crosslinked polymers" are those polymers that have bonds between polymer chains. Branched polymers are also included in the invention.

The polymer particles formed may be erodable or nonerodable, biodegradable or nonbiodegradable and biocompatible or nonbiocompatible. "Degradable or erodable polymers" are those that degrade upon exposure to some stimulus, including time. Degradable or erodable polymers include biodegradable polymers. Biodegradable polymers degrade in a biological system, or under conditions present in a biological system. Preferred biodegradable polymers degrade in an organism, preferably a mammal, and most preferably a human. Examples of biodegradable polymers include those having at least some repeating units representative of at least one of the following: an alpha-hydroxycarboxylic acid, a cyclic diester of an alpha-hydroxycarboxylic acid, a dioxanone, a lactone, a cyclic carbonate, a cyclic oxalate, an epoxide, a glycol, and anhydrides. Preferred degradable or erodable polymers comprise at least some repeating units representative of polymerizing at least one of lactic acid, glycolic acid, lactide, glycolide, ethylene oxide and ethylene glycol.

A class of polymers included in this invention are biocompatible polymers. One type of biocompatible polymers degrade to nontoxic products. Specific examples of biocompatible polymers that degrade to nontoxic products that do not need removal from biological systems include poly (hydro acids), poly(L-lactic acid) or L-PLA, poly (D,L-lactic acid) or D,L-PLA, poly (glycolic acid) and copolymers thereof. Polyanhydrides have a history of biocompatibility and surface degradation characteristics (Langer, R. (1993) Acc. Chem. Res. 26:537-542, Brem, H. et al. (1995) Lancet 345:1008-1012; Tamada, J. and Langer, R. J. (1992) J. Biomat Sci.-Polym. Ed. 3:315-353).

The polymer particles may contain other substances and may be used for controlled release of a desired substance in an organism or system. For example, the polymer particles may be used for controlled release of a bioactive material. A "bioactive" material is any substance which may be administered to any biological system, such as an organism, preferably a human or animal host, and causes some biological reaction. Bioactive materials include pharmaceutical substances, where the substance is administered normally for a curative or therapeutic purpose. The bioactive material may comprise a protein or other polypeptide, an analgesic or another material. In one embodiment, the bioactive material has a molecular weight less than 1000 Da. Suitable bioactive material includes, without limitation, tacrine, erythromycin, erythromycin estolate, and erythromycin ethylsuccinate. The particles may also be used for controlled release of agricultural materials such as fertilizers and pesticides. Other applications include controlled release of fragrances and corrosion inhibitors.

The average diameter of the particles can be measured by any means known to the art, including dry powder time of flight techniques and dynamic light scattering. The average diameter may be calculated as either a volume weighted average or a number weighted average. The particles of the invention may have an average diameter less than about 15 μm, less than about 10 μm, less than about 5 μm, or less than about 1 μm. As used herein, "nano-scale particles" and "nanoparticles" are particles that are less than about 1 μm in diameter. By "controlled particle size" it is meant that that both the size and the size distribution of the particles are controlled. One measure of the size distribution of the particles is the polydispersity, or ratio of the volume weighted average particle diameter to the number weighted average particle diameter. For a monodisperse sample the polydispersity is 1. In the present invention, the polydispersity can be less than about 1.75, less than about 1.5, or less than about 1.3.

If the apparatus is a PCA apparatus for particle formation, the temperature and pressure of the chamber can be established by temperature and pressure control systems as are known to those skilled in the art. For example, the temperature can be controlled by placing the particle formation chamber within an enclosure and using an air bath, a water bath, line heating or cooling on inlet lines. The temperature within the particle formation chamber is typically maintained within the range of 0.9 to 1.5 times the critical temperature of the supercritical or near-supercritical fluid. The pressure in the vessel can be controlled with a back-pressure regulator or any other device design capable of maintaining an upstream pressure greater than the downstream pressure. The pressure within the particle formation chamber is typically maintained within the range of 0.9 to 1.5 times the critical pressure of the supercritical or near-supercritical fluid.

If the apparatus for particle formation is a CAN-BD apparatus, the temperature and pressure of the chamber can be established by temperature and pressure control systems as are known to those skilled in the art. For example, the temperature can be controlled by a temperature controller connected to a heater and a thermocouple. Suitable heaters include a heating rod. Typical temperature ranges for CAN-BD are between 0-90° C. CAN-BD is typically conducted at atmospheric pressure, or just below atmospheric pressure. The pressure in the chamber may be maintained below atmospheric pressure through the use of appropriate vacuum technology.

As used herein, "supercritical or near-supercritical fluid" means a substance that is above its critical pressure and temperature or is substantially near its critical pressure and temperature. By substantially near, it is meant that the pressure or temperature is within the range of 0.9 to 1.5 times the critical pressure or temperature. These fluids include carbon dioxide, ammonia, nitrous oxide, methane, ethane, ethylene, propane, butane, pentane, benzene, methanol, ethanol, isopropanol, isobutanol, fluorocarbons (including chlorotrifluoromethane, monofluoromethane, hexafluoraethane and 1,1-difluoroethylene), toluene, pyridine, cyclohexane, m-cresol, decalin, cyclohexanol, o-xylene, tetralin, aniline, acetylene, chlorotrifluorosilane, xenon, sulfur hexafluoride, propane and others. Carbon dioxide, ethane and propane are preferred supercritical or near-supercritical fluids. Most preferably, carbon dioxide is used. One supercritical or near-supercritical fluid, or a mixture of different fluids may be used.

If the apparatus is a PCA apparatus, the supercritical or near-supercritical fluid functions as an antisolvent. As used herein, "antisolvent" is a substance in which the solute is substantially not soluble. It should be understood that it is possible that the antisolvent may be capable of dissolving some amount of the solute without departing from the scope of the present invention. The antisolvent is, however, preferably incapable of dissolving a significant portion of the solute such that at least a significant portion of solute is, in effect, not soluble in the antisolvent.

If the apparatus is a PCA apparatus, useful solvents include those that dissolve some portion of the solute of interest and are preferably at least partially soluble in the antisolvent used. Preferably the solvent is miscible in the antisolvent or antisolvent mixture at the temperature and pressure of operation. Preferred solvents are non-aqueous.

Some examples of preferred solvents include methylene chloride, methanol, toluene, propanol, ethanol, acetone, ethers, hexanes, heptane, tetrahydrofuran, methyl ethyl ketone, chloroform, carbon tetrachloride, butanone, dimethyl sulfoxide, isopropanol, ethyl acetate, methyl acetate, n-methylpyrrolidine, propylene carbonate, alkanes, and acetonitrile. If a liquid or liquidizable polymer precursor is used, a solvent is not necessary. One solvent or a mixture of solvents may be used.

If the apparatus is a CAN-BD apparatus, useful solvents include those that dissolve some portion of the solute of interest and are preferably at least partially insoluble in the antisolvent used. Some examples of preferred solvents include water, acetone, ethanol, methanol, isopropanol, ethyl acetate, acetonitrile, and fluorinated solvents. One solvent or a mixture of solvents may be used.

As used herein, a "solute" is a substance which can be dissolved in a solvent which can used to form the particles of interest. A polymer precursor can be used as a solute in making polymer particles. "Polymer precursor" means a molecule or portion thereof which can be polymerized to form a polymer or copolymer. Polymer precursors include any substance that contains an unsaturated moiety or other functionality that can be used in chain polymerization, or other moiety that may be polymerized in other ways. Such precursors include monomers and oligomers. A "multifunctional monomer" is a monomer having two or more sites available for bonding to other molecules during polymerization.

Precursors include those that are capable of being polymerized by photoradiation. One class of precursors that are capable of being polymerized by photoradiation are photosensitive precursors. If a polymer precursor that polymerizes photochemically is used (photosensitive polymer precursor), a separate photoinitator does not need to be used. Examples of photosensitive polymer precursors include tetramercaptopropionate and 3,6,9,12-tetraoxatetradeca-1,13-diene. Another class of precursors that may be used are radically polymerizable precursors. Another class of precursors that may be used are ionically polymerizable precursors. Another class of precursors that are useful in the invention are cationic precursors.

Some examples of precursors that are useful in the invention include ethylene oxides (for example, PEO), ethylene glycols (for example, PEG), vinyl acetates (for example, PVA), vinyl pyrrolidones (for example, PVP), ethyloxazolines (for example, PEOX), amino acids, saccharides, proteins, anhydrides, vinyl ethers, amides, carbonates, phenylene oxides (for example, PPO), acetals, sulfones, phenylene sulfides (for example, PPS), esters, fluoropolymers, imides, amide-imides, etherimides, ionomers, aryletherketones, olefins, styrenes, vinyl chlorides, ethylenes, acrylates, methacrylates, amines, phenols, acids, nitriles, acrylamides, maleates, benzenes, epoxies, cinnamates, azoles, silanes, chlorides, epoxides, lactones and amides. A preferred group of precursors includes all the above precursors with the exception of fluoropolymers.

The nozzle of the invention has at least two inlets into the mixing chamber and at least one outlet from the mixing chamber. Each of the two fluids being introduced into the particle formation chamber flows from at least one inlet to at least one outlet. The inlets and outlet(s) are located so that each fluid has a component of flow parallel to the nozzle axis.

Figure 1C:
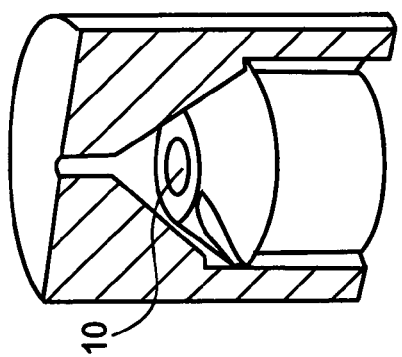
Figure 1A:
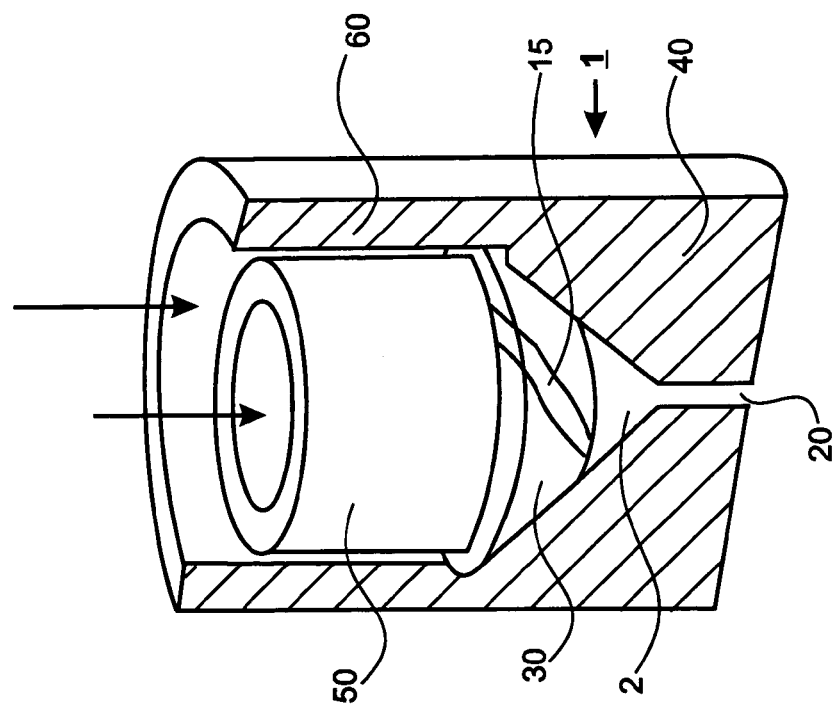

The invention provides a nozzle which creates at least two jets within a mixing chamber, wherein at least one of the jets is a swirling jet. The mixing chamber can also be termed a "swirl chamber." FIGS. 1A-1C show a nozzle (1) configuration which comprises a mixing chamber (2) having interior walls (3) having a angle ($\theta_1$) of less than 90° with respect to the longitudinal axis (5) of the nozzle; one axial inlet (10) to the mixing chamber which is parallel to axis (5); one swirl inlet (15) to the mixing chamber which is not parallel to axis (5); and one axial outlet (20) from the mixing chamber. The flow from each inlet to the outlet has a component of flow parallel to longitudinal axis (5). As used herein, a "swirl inlet" is an inlet which produces a swirling jet when fluid flows through the inlet under normal PCA operating conditions.

In FIGS. 1A-1C, axial inlet (10) and swirl insert (15) have been fabricated in swirl insert (30) and the walls (3) of the mixing chamber (2) have been fabricated in nozzle body (40). The mixing chamber as a whole is created when the swirl insert contacts the nozzle body. Inlets (10) and (15) are in fluid communication with a system for providing coaxial flow of the supercritical or near-supercritical fluid and the solution, of which inner tube (50) and outer tube (60) are shown in FIG. 1A. The system provides coaxial flow of the two fluids to the nozzle through the inner tube (50) and the outer tube (60). Supercritical or near supercritical fluid can be flowed through the inner tube (50) and solvent/solute through the outer tube (60). Inner tube (50) is connected to swirl insert (30) to prevent fluid flow between the inner and outer tubes. Outer tube (60) is connected to nozzle body (40) to prevent leaking of fluid from the system. The connections may be made by any means known in the art, including threaded connections and standard tube fittings (in which case the nozzle body may be formed in part by the fitting) or a microlamenant design. The swirl insert is arranged within the nozzle body so that fluid flowing between the inner and outer tube passes through the inlets formed in the swirl body rather than between the swirl insert and the nozzle body. It is sufficient that the swirl insert be sized to fit closely within the nozzle body, although the swirl insert can also be connected to the nozzle body by any means known to the art. For configurations where the swirl insert fits closely within the nozzle body, the swirl insert can be any shape which allows the outer walls of the insert to fit closely within the nozzle body and which allows fabrication of the inlets to the swirl chamber. For the configuration shown in FIGS. 1A-1C, the swirl insert can be a cone as well as a conical section.

The nozzle can have a different configuration that that shown in FIGS. 1A-1C. Swirl mixing geometries are known in other arts and are described, for example, by Lefebre (Lefebre, A. H., (1989) Atomization and Sprays, Hemisphere Publishing Corp., Bristol, Pa.) and Bayvel and Orzechowski (Bayvel, L. and Orzechowski, Z., (1993) Liquid Atomization, Taylor and Francis, Washington, D.C.). For example, either the solvent or supercritical or near-supercritical fluid can swirl or both fluids can swirl. The swirling can be clockwise or counter clockwise. However, if the swirling jets rotate in opposite directions, the benefit of the rapid radial expansion outside the nozzle might be reduced or lost due to the loss of momentum caused by jet mixing (i.e. swirling jets counteracting one another). Multiple supercritical or near-supercritical fluid inlets, solution inlets, and outlets can be used. In addition, the mixing chamber can have a different geometry, although it is preferred that the walls of the swirl chamber converge towards the outlet.

The inlets are sized so that flow through each inlet creates a jet under normal operating conditions. As used herein, a "jet" is a continuous stream of concentrated and well-defined incompressible or compressible fluid emitted by an orifice. A swirling jet has a tangential velocity component as well as an axial component. The swirl inlet is aligned so that it generates a substantial tangential velocity component. A swirl inlet may be perpendicular to the nozzle axis but not 100% parallel to the axis.

Under normal PCA operating conditions where there is negligible surface tension, axial inlet (10) is believed to produce a turbulent gas jet that expands in a solid conical shape (Lengsfeld et al. (2000), supra). Similarly, swirl inlet (15) is believed to produce a swirling hollow-cone annular jet. These axial and swirling jets interact, exchanging mass and momentum, within the mixing chamber, then exit the chamber outlet. The swirling gaseous jet spreads radially after ejection from the swirl chamber. The radial expansion acts to rapidly dilute the particles once they have formed, limiting the time for particle growth by agglomeration.

The optimal inlet diameters, outlet diameters and chamber dimensions depend upon the desired power input or energy for mixing inside the swirl chamber. The energy for mixing inside the swirl chamber can be estimated from the head loss resulting from solution and supercritical or near-supercritical fluid flow through the swirl chamber. Estimates for the total head loss, or the pressure loss from the pump to the particle formation chamber based on supercritical or near-supercritical fluid flow through an axial inlet, can be obtained from equation 1 (R. W. Fox, A. T. McDonald, Introduction to Fluid Mechanics, $4^{th}$ edn., John Wiley & Sons, NY, 1992).

$$\left(\frac{P_1}{\rho_1}+\frac{\overline{V_1^2}}{2}+gz_1\right)-\left(\frac{P_2}{\rho_2}+\frac{\overline{V_2^2}}{2}+gz_2\right)=h_{lt} \tag{1}$$

In equation 1, g is the acceleration due to gravity [length/time$^2$], $h_{lt}$ is the total head loss [length$^2$/time$^2$], P is the pressure [mass/(length time$^2$)], $\overline{V}$ is the average velocity [length/time], z is the height [length]), and ρ=density [mass/length$^3$]. Subscript 1 indicates the entrance plane into the control volume (at the pump) and subscript 2 indicates the exit plane out of the control volume (inside the precipitation vessel). To determine the head loss across the mixing chamber, the losses due to fittings and tubing are subtracted from the total head loss. The total head loss ($h_{lt}$) is comprised of major and minor losses. Major losses are due to frictional effects for fully developed flow in constant-area tubes. Minor losses are due to fluid flow through valves, fittings, area changes, and entrance effects, where the head loss that occurs is primarily due to flow separation, with energy being dissipated by intense mixing in the separated zones. Table 1 shows the calculated power input into the nozzle for four different variations on the nozzle configuration shown in FIG. 1. The calculated power input is orders of magnitude higher than power inputs to typical mixing processes in other arts such as gas dispersion and MSMPR crystallizers Coulsen et al. (J. M. Coulson, J. F. Richardson, J. R. Backhurst, J. H. Harker, Chemical Engineering, Vol. 1, $5^{th}$ ed., Butterworth-Heineman, Oxford, England, 1996).

The kinematics of the fluid flow at the inlet and outlet of the mixing chamber has a decisive influence on mixing intensity in the mixing chamber. For the configuration shown in FIGS. 1A-1C, one important dimension of the mixing chamber is the axial inlet diameter. For a specified flow rate, this dimension determines the average flow velocity and hence the average kinetic energy per unit mass of the incoming fluid. Increasing the kinetic energy of the incoming fluid will dissipate more energy in the mixing chamber, thereby increasing the mixing intensity. A second important dimension is the outlet diameter of the mixing chamber. The outlet is preceded by a converging conical section (decreasing cross-sectional area), which acts to accelerate the fluid mixture towards the outlet. The outlet diameter governs the final flow velocity and head loss in the last portion of the swirl chamber. For the range of dimensions shown in Table 1, roughly 85% of the total head loss occurs across the outlet of the swirl chamber. For an axial supercritical or near-supercritical fluid inlet and mixing chamber outlet, preferred ratios of inlet to outlet diameter range from 1:20 to 20:1, more preferred ratios range from 10:1 to 1:10 and most preferred ratios range from 2:1 to 1:2.

If the apparatus is a PCA apparatus, a third important design variable is the mean residence time in the mixing chamber (mixing chamber volume divided by the system flow rate). This time constant governs the mean time available for particle growth after primary nucleation. Without wishing to be bound by any particular theory, variations in mean particle residence times are believed to translate into polydisperse particle size distributions due to different times for particle growth.

The invention provides a method for producing particles with diameter less than about 15 microns comprising the steps of: mixing a first fluid and a second fluid in a mixing chamber, wherein mixing occurs through interaction of at least one first fluid jet and at least one second fluid jet in the mixing chamber and least one of the jets is a swirling jet; and spraying the mixed fluids through an outlet into the chamber of an apparatus for forming particles, wherein the first fluid is selected from the group consisting of a supercritical or a near-supercritical fluid and the second fluid is a solution comprising a solvent and a solute. The apparatus for forming particles can be a PCA apparatus of a CAN-BD apparatus.

Without wishing to be bound by any particular theory, the interaction of the jets within the mixing chamber of a PCA apparatus is believed to contribute to homogenous mixing of the solution and the supercritical or near-supercritical fluid within the chamber. Homogeneous mixing within the chamber generates a uniform supersaturation level of the solute and hence uniform particle nucleation and subsequent precipitation. Outside the mixing chamber, the swirling jet also reduces agglomeration of the particles.

When the jets are not well mixed and mixing is not confined to the swirl chamber a visible opaque region can be observed just downstream of the nozzle discharge orifice. The incomplete mixing produces a discontinuity in the local index of refraction, which in turn diffracts the incident light. This opaque region is the location of intense jet mixing and can be used to define ajet-mixing length. Outside the mixing region, in the bulk of the particle formation chamber, the fluid mixture is transparent with no change in the index of refraction, indicating that the two fluids are completely mixed.

In the PCA process, the variables used to control particle size include: solute concentration, supersaturation level, residence time, temperature, and supersaturation level based on solvent choice (there are different levels of miscibility between the solvent/supercritical or near-supercritical fluid based on the solvent selection). The particle diameter and size distribution are affected by the mixing power. The particle diameter can be influenced by the influence of the mixing power on the supersaturation. Without wishing to be bound by any particular theory, increasing the mixing power is believed to decrease the smallest turbulent length scale (eddy size), which acts to enhance the mass transfer rates, and increase both the rate at which supersaturation is reached and the level of supersaturation obtained. Nucleation rate expressions are governed by the exponential dependence on supersaturation, therefore, high degrees of supersaturation result in fast nucleation rates yielding small particles.

In the methods of the invention for producing nanoscale particles in a PCA system, it is preferred that the power input into the nozzle is above about $6.5 \times 10^9$ W/m$^3$.

Without wishing to be bound by any particular theory, the interaction of the jets within the mixing chamber is believed to help the CAN-BD process by efficiently mixing supercritical or near-supercritical fluid with liquid solvent. This, in turn, increases the mass transfer rate between the two phases, resulting in a greater concentration of supercritical or near-supercritical dissolved in the liquid solvent. Higher supercritical or near-supercritical concentrations in turn result in more vigorous expansion of the liquid droplets after they are injected in the chamber, with concomitant increases in drying rate, shorter drying plumes, and lowered requirements for additional heating gas streams. The length of this plume is important for equipment design, as the plume must not impinge on any surfaces or vessel walls before evaporation is complete, or else severe agglomeration of wet particles may result.

EXAMPLES

Formation of Poly(l-lactide) Particles with the PCA Process

Poly (l-lactide) (PLA) was purchased from Birmingham Polymers, Inc. (Birmingham, Ala.) and used as received. The reported average molecular weight was 100,000. Methylene chloride (HPLC grade) and isopropyl alcohol were purchased from Fischer Scientific (Pittsburgh, Pa.), and medical grade carbon dioxide was obtained from United States Welding Inc. (Denver, Colo.).

Figure 2:
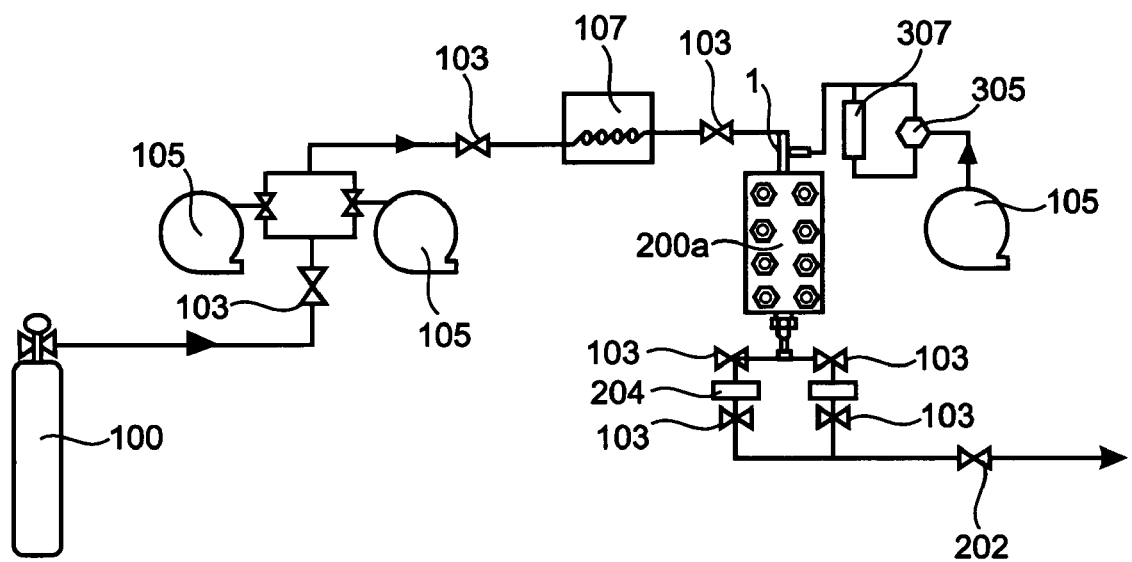
FIG. 2 schematically illustrates a PCA apparatus used to form polymer particles.

The experimental apparatus used to perform the PCA process in a semi-continuous fashion is shown in FIG. 2. Carbon dioxide from a gas supply cylinder (100) was fed into two ISCO model 260D syringe pumps (105) that were chilled by ethylene glycol jackets to −12° C. The ISCO pumps were controlled by an ISCO series D pump controller. Liquid carbon dioxide was then reheated to 35° C. by a water bath (107) prior to entering the nozzle and then the particle formation vessel. Valves (103) are also shown. The particle formation vessel (200a) consisted of a high-pressure sight gauge (Inferno model BTED-15AANEABGA) with side-mounted view cells to allow optical access. Enclosing the particle formation vessel inside a polycarbonate box and using an air bath maintained the temperature of the vessel at 35° C. Pressure in the vessel was controlled with a Tescom back-pressure regulator (202) (max pressure regulated is 27.6 MPa). Fresh solvent was pumped into the nozzle by a third ISCO model 260D syringe pump (105). A Rheodyne injection valve (305) (model 7010) was used to direct the solvent flow into the nozzle to obtain a steady state concentration of solvent in the particle formation vessel, or to direct the solvent flow into a high-pressure sample cylinder for jet mixing length measurements and PCA particle producing runs. The high-pressure sample cylinder (307) was manufactured from 316 stainless steel and consisted of a 10 mL reservoir and a movable piston. The cylinder was designed so a premixed solution of PLA in methylene chloride could be delivered to the nozzle with no dilution.

The nozzle configuration shown schematically in FIGS. 1A-1C was used. The nozzle body was constructed of a main nozzle body, machined from 316 stainless steel, and a cap end, machined from brass. The swirl inserts were also machined from brass. A threaded bushing was machined from 316 stainless steel to connect the swirl insert to the inner tube supplying the antisolvent. The nozzle was sealed with Dehrin and Viton o-rings (Rocket Seals Co., Englewood, Colo.). Three swirl inserts and two cap ends were used to create four swirl chambers of different volumes. The swirl inserts were characterized by the insert tip diameter and the diameter of the axial inlet and the cap ends were characterized by the diameter of the exit outlet. The volumes of the swirl chambers, a combination of the volume of a frustum of a cone and a right circular cylinder, were calculated from the dimensions of the swirl inserts and cap ends. Table 1 lists the characteristic dimensions of the swirl inserts and cap ends, the calculated swirl chamber volumes, and the power input into the swirl chambers based on $CO_2$ flow. The power input into the mixing chamber was estimated using equation 1. Physical properties for $CO_2$ were obtained from the NIST Chemistry WebBook (E. W. Lemmon et al, (2001) in: P. J. Lindstrom, and W. G. Mallard (Eds), NIST Chemistry WebBook, NIST Standard Reference Database No. 69, National Institute of Standards and Technology, Gaithersberg, Md. (http://webbook.nist.gov)) and Vesovic et al. (V. Vesovic et al., (1990), J. Phys. Chem Ref. Data, 19, 763.)

The precipitation experiments were operated in a semi-continuous manner and were conducted as follows. The particle formation vessel was pressurized to 8.5 MPa, the temperature inside the polycarbonate box was set to 35° C., and then the $CO_2$ pumps operated in a continuous fashion delivering $CO_2$ at a constant flow rate of 25 mL/min. The solvent pump was set to deliver $CH_2Cl_2$ at a constant flow rate of 1.0 mL/min and the system was allowed to run for ~2 residence times to obtain a steady state concentration of $CO_2$ and $CH_2Cl_2$ in the precipitation vessel. The temperature inside the box was kept constant at 35° C. for all precipitation experiments. Once the temperature and pressure had stabilized, 6-8 mL aliquots of a premixed 1.0 wt % PLA in $CH_2Cl_2$ were injected with a 10 mL syringe and 18 gauge needle into the sample cylinder. The sample cylinder was then purged with $CH_2Cl_2$ to remove any residual air that entered the cylinder when the PLA sample was loaded. The injection valve was used to redirect fresh $CH_2Cl_2$ to the sample cylinder allowing the loaded sample to flow to the nozzle. Two filters (204) with a 0.2 µm pore diameter (Millipore Cat No. GVHP04700) were positioned directly below the particle formation vessel to collect the precipitated PLA particles. The filters were labeled filter #1 and filter #2. Valves (103), selected as needle valves, upstream and downstream of the filters controlled the system flow. One system of valves was opened during the precipitation experiments to collect PLA particles on filter #1, and the other system of valves was kept closed. The precipitation process was run until the chamber began to clear (~10 min from the time of the sample injection), which indicated the loaded sample had passed through the nozzle. The solvent flow was then stopped, whereas the $CO_2$ continued to flow into the chamber at 25 mL/min to wash out the supercritical solution formed by the $CO_2$ and $CH_2Cl_2$. A minimum of 150 mL of $CO_2$, with a flow rate of 25 mL/min, was passed through the particle formation vessel to dry the PLA particles and to avoid re-condensation of $CH_2Cl_2$ inside the vessel or on the filter. Once the particles had dried, the valves upstream and downstream of filter #1 were closed, and the valve system for filter #2 was opened. Another 150 mL of $CO_2$ was passed over filter #2 to remove any residual $CH_2Cl_2$. The particle formation vessel and filter #2 were then gradually depressurized over ~20 min, followed by another ~20 min to depressurize filter #1. Samples of the PLA precipitate were collected from both filters and placed in a microcentrifuge tube (Life Sciences Product Inc., model 8510-500CMT-2). The microcentrifuge tubes were then stored in a desiccator at room temperature (~25° C.) until the particles were characterized.

Characterization of of Poly(l-lactide Particles)

Figure 3:
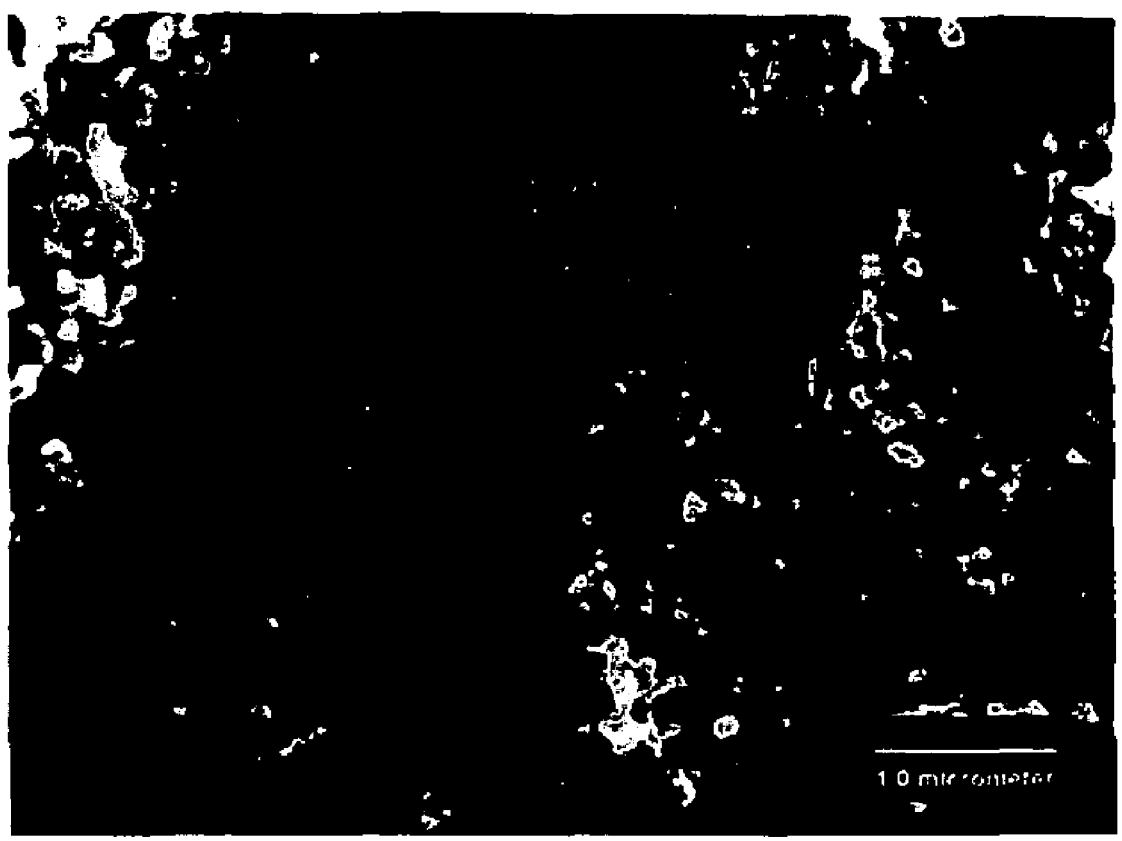
FIG. 3 shows a SEM image of PLA particles formed with a power input into the nozzle of about $6.5 \times 10^9$ W/m$^3$.

PLA particle samples were analyzed with a scanning electron microscope (SEM) to determine particle morphology and the upper and lower limits of the particle size distribution. A SEM (model ISI-SX-30) was used to analyze the samples from the three largest swirl chambers and a SEM (JEOL JSM-5600) was used to analyze samples from the smallest swirl chamber. Samples were prepared for SEM analysis by mounting a piece of double-stick carbon tape on an aluminum stub and then placing a portion of the sample on the tape. The samples were sputter coated with gold and then imaged. FIG. 3 shows a SEM image of PLA particles formed using the smallest swirl chamber design and a power of $6.5 \times 10^9$ W/m$^3$.

Number weighted particle size distributions and average diameters (volume weighted) for the three largest swirl chambers were measured using a TSI Aerosizer DSP (model 3225) equipped with a TSI Aero-Disperser (model 3230). At least 200,000 particles were counted from each sample to ensure reliable statistics.

Particles produced using the smallest swirl chamber volume were too small to be analyzed using the dry powder time-of-flight technique; so dynamic light scattering (DLS) was used to characterize these samples. The DLS system consisted of a Brookhaven Instruments Corp. (BIC) goniometer (BI-200SM), a BIC digital correlator (BI-9000AT), and a 532 nm vertically polarized solid-state laser with 125 mW power output (Uniphase, μGreen Laser, model 4301-050). Software provided with the instrument contained an integrated size distribution analysis package with three fitting algorithms used to deduce a particle size distribution from the autocorrelation function. The algorithms used were the cumulant fit, the nonlinear least constrained continuous (NNLS cont), and the nonlinear least constrained regular (NNLS reg). The fitting algorithms make different assumptions as to the shape of the particle size distribution. NNLS cont and the method of cumulants assume a gaussian size distribution, where as the NNLS reg assumes a bimodal size distribution. The average (particle size and size distribution reported by the software are considered accurate when the three fitting algorithms converge to the same result.

Samples were prepared for DLS analysis by the following procedure: First a 10 wt % solution of isopropyl alcohol (IPA) in distilled water was prepared and filtered through a 0.20 micrometer pore diameter cellulose nitrate membrane (Advantec Inc. model 25AS020AS) into a 5 mL polystyrene conical tube (Becton Dickinson model 352095). PLA particles were then added to the IPA solution and the sample was sonicated for 2 minutes to disperse particle aggregates using an ultrasonic processor (Heat Systems-Ultrasonic Inc. model W-380). The sample was then filtered into a cuvette using a cellulose acetate membrane with a 0.45 micrometer pore diameter (Advantec Inc. model 25CS045AS). The second filtering step was in place to ensure that no particle aggregates would be present in the sample cuvette upon analysis.

In order to compare the average particle diameters reported by the two different sizing techniques, the number-weighted size distribution measured by the Aerosizer had to be converted to volume-weighted size distribution. In making the conversion from a number to a volume-weighted distribution, care must be taken to ensure that the smaller particle diameters are not underrepresented after the conversion. Small "tails" in the number weighted size distributions reported by the Aerosizer, which began around 3 μm, indicated particle aggregates were not being adequately dispersed by the Aero-Disperser. SEM micrographs of the PLA samples provided additional evidence for this conclusion. Individual particle diameters observed in the micrographs never exceeded 3 μm. In addition, raw count data from the Aerosizer showed that no more than 2.5% of the total number of particles counted in each sample had a diameter greater than 3.0 μm. A majority of the samples had ~0.8% of the total number distribution with a diameter greater than 3.0 μm. Based on the raw count data from the Aerosizer and visual evidence from the SEM micrographs, an upper bin size of 3.0 μm was selected for the statistical determination of the volume weighted particle diameter.

Figure 4:
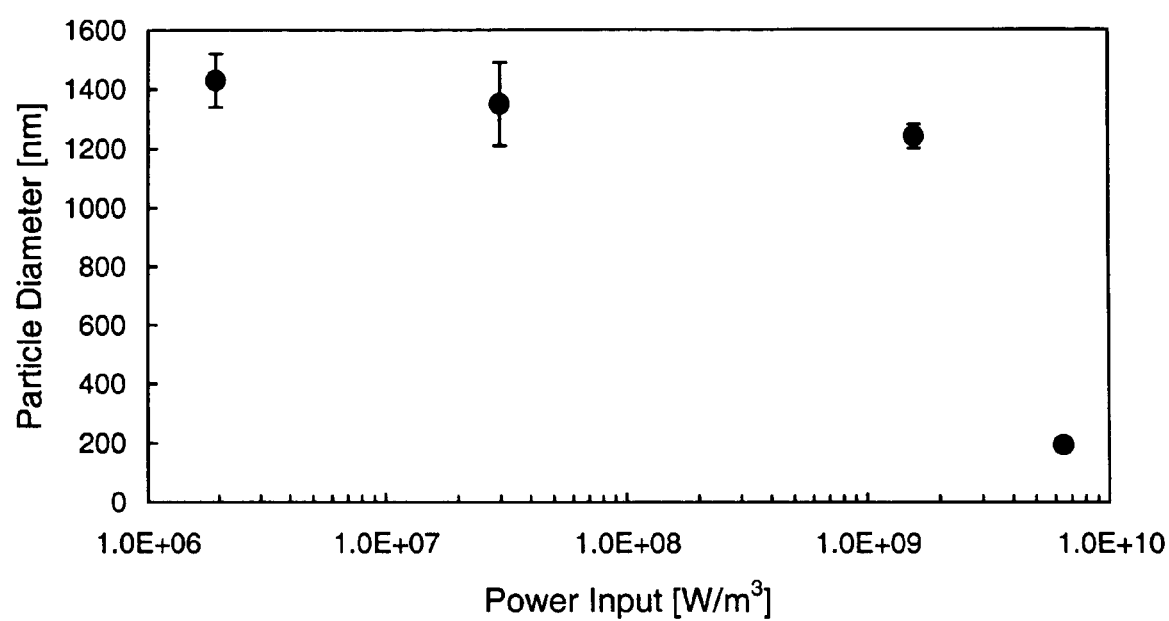
FIG. 4 shows the effect of power input into the nozzle per unit volume on the average PLA particle diameter.

FIG. 4 shows the effect of power input into the nozzle per unit volume on the average PLA particle diameter. In all experimental runs the temperature and pressure inside the precipitation vessel were held constant at 35° C. and 8.5 MPa, the PLA loading was 1.0 wt %, the $CO_2$ flow rate (at the pump) was 25.0 mL/min, and the $CH_2Cl_2$ flow rate was 1.0 mL/min. The data points represent the average of three precipitation runs performed at each swirl chamber volume, and the error bars represent the standard deviation in the three measurements. The most significant change in the average particle diameter occurred (1240+/−40 nm to 193+/−22 nm) when the power input into the nozzle was increased from $1.6 \times 10^9$ to $6.5 \times 10^9$ W/m$^3$. Table 2 lists the average particle size and polydispersity obtained for different swirl (mixing) chamber volumes.

Jet Mixing Length in a PCA Apparatus

Jet imaging experiments were conducted inside the particle formation vessel and were performed as follows using the apparatus schematically shown in FIG. 2. The particle formation vessel was pressurized to 8.5 MPa, the temperature inside the polycarbonate box was set to 35° C., and the system was allowed to stabilize. Pure methylene chloride ($CH_2Cl_2$) was then pumped at a flow rate of 1.0 mL/min through the nozzle until a steady jet was observed exiting from the nozzle exit outlet. As soon as a steady jet of $CH_2Cl_2$ was observed, the $CO_2$ flow (25 mL/min) was initiated and the system ran for~two residence times to obtain a steady state concentration of $CO_2$ and $CH_2Cl_2$ inside the precipitation vessel. The high-pressure sample cylinder was then loaded with fresh $CH_2Cl_2$ using a 10 mL syringe (Henke-Sass, Wolf model 8537) and an 18-G needle (Becton Dickinson model 305196). Once a steady state concentration was obtained the solvent flow was redirected through the high-pressure sample and the jet-mixing length was recorded. The $CH_2Cl_2$ flow was directed through the sample cylinder to make sure that the jet-mixing length recorded was representative of the $CH_2Cl_2$ flow through the sample cylinder and not directly from the solvent pump. The jet-mixing length was imaged five consecutive times and the images were recorded using a DuncanTech high-resolution digital camera (DT1100) equipped with a telephoto lens. The digital camera was controlled with National Instruments (PCI-1424) frame grabber software. A 60-watt light bulb was used to backlight the view cells and a fiber optic cable (Fiber-Lite PL-900) was used to light the jet foreground. A 7.6 by 6.2 mm spatial region was imaged on a 1392 (horizontal) by 1040 (vertical) pixel matrix with a pixel size of 4.65 by 4.65 micron. Once the jet mixing length had been imaged the precipitation vessel was depressurized and the nozzle removed. A ruler was then inserted into the precipitation vessel and imaged to calibrate the pixel length obtained in the images to a metric length. Color images from the digital camera were stored on a 650 MB disk and converted to an 8-bit gray scale and analyzed using ImageJ (NIH) software.

The jet mixing length was defined as the location downstream of the nozzle discharge outlet where the average pixel intensity of the opaque region emerging from the nozzle was reduced to 90% of the average background pixel intensity. Six different linear cross sections (36 pixels in length) of the transparent region (located in the bulk of the precipitation vessel) were analyzed and averaged to determine the background pixel intensity. The jet mixing length was measured by analyzing transverse cross sections of the opaque region and calculating the average pixel intensity. Beginning at the nozzle outlet, cross sections were analyzed in a sequential manner until the pixel location defining the jet mixing length was found. The pixel length of the jet-mixing region was then converted to distance in micrometers using pixel length to distance calibration data.

Figure 5:
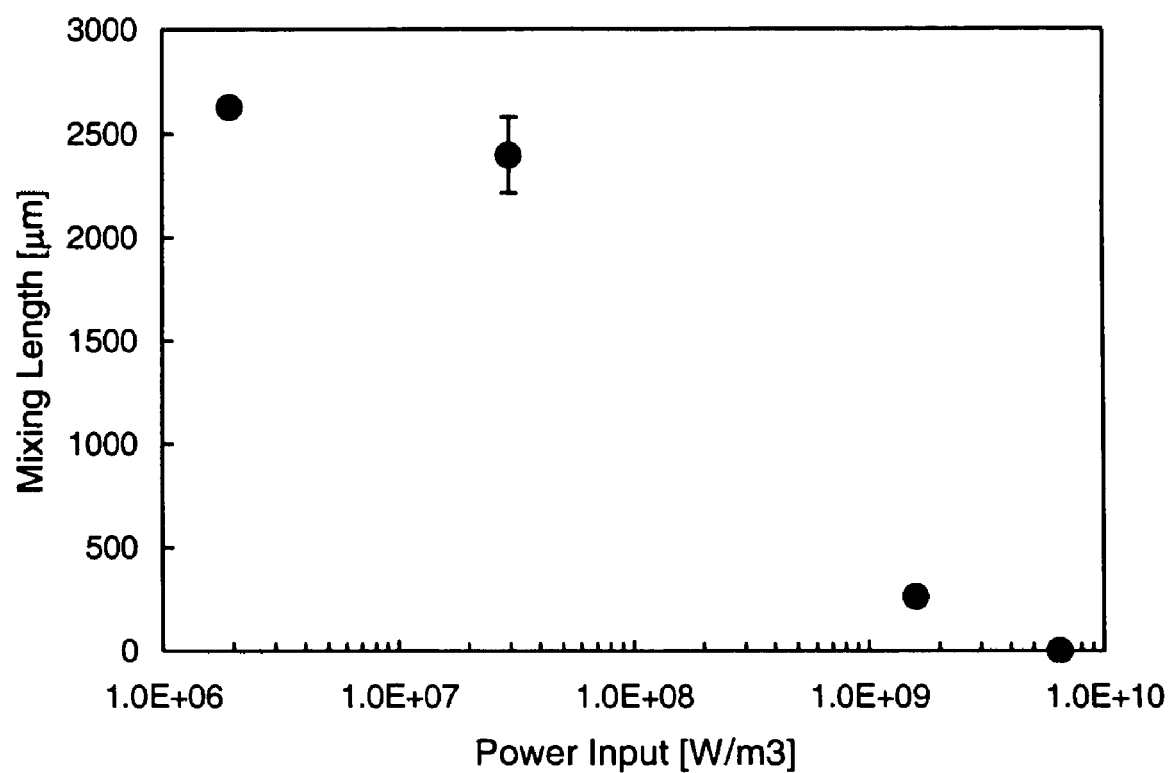
FIG. 5 shows the effect of increasing the power input into the mixing chamber on the measured jet mixing length.

FIG. 5 shows the effect of increasing the power input into the swirl chamber on the measured jet mixing length. The temperature, pressure, and flow rates were identical to the values reported above. Each jet-mixing length was imaged five times and the data points represent the average of these five measurements. The error bars represent the standard deviation in the five measurements, and most are approximately the size of the data points presented. As the power input per unit volume is increased, the degree of mixing between the two jets increases, shown by a decrease in the measured jet mixing length. The largest decrease in the mixing length (2396+/−183 µm to 261+/−42 µm) occurs when the power input is increased from $3.0 \times 10^7$ to $1.6 \times 10^9$ W/m$^3$. Increasing the power input to $6.5 \times 10^9$ W/m$^3$ resulted in complete mixing of the $CO_2$ and $CH_2Cl_2$ inside the swirl chamber, indicated by no observable jet mixing length.

Calculation of the Precipitation Kinetics of PLA Particles During the PCA Process The population balance theory, as developed by Randolph and Larson, has been extensively used to determine nucleation and growth kinetics from mixed-suspension, mixed-product removal (MSMPR) crystallizers (A. D. Randolph, M. A. Larson, Theory of Particulate Processes, Academic Press, San Diego, Calif., 1988) MSMPR crystallizers operate under the following constraints: perfectly mixed (i.e. anywhere in the mixing volume a full and uniform particle size continuum exists), unclassified withdrawal (i.e. the particle size distribution of the product crystals is the same as the distribution in the mixing volume), no particle breakage, size independent growth, uniform particle shape factor, and steady state operation. Under these constraints, a macroscopic population balance can be integrated to yield the following equation:

$$n = n_o \exp\left(\frac{-L}{G\tau}\right) \quad (2.0)$$

where n is the population density, $n_o$ is the population density of embryo-size nuclei, L is the particle size, G is the linear growth rate, and τ is the mean particle residence time. When the population density function is plotted against the particle size on semi-logarithmic coordinates, a straight line should occur. From this straight line, the particle growth rate can be determined from the slope using the expression:

$$\text{slope} = \frac{-1}{G\tau} \quad (3.0)$$

and the population density of embryo-size nuclei can be determined from the intercept. The particle nucleation rate ($I_o$) may then be determined from:

$$I_o = n_o G \quad (4.0)$$

Particle size distribution (PSD) data is used to calculate values of the population density function. Size distribution data obtained from dynamic light scattering instruments are based on a percentage volume distribution (or percentage mass distribution if the particle density is assumed to be constant), and the mass fractions can be converted to a population density by the following expression (A. D. Randolph, M. A. Larson, (1998, supra)

$$n = \frac{\Delta w M_T}{\Delta L k_v \rho \bar{L}^3} \quad (5.0)$$

where $\Delta w$ is the mass fraction of particles in the size range $L_1$ to $L_2$, $M_T$ is the suspension density (i.e. mass of solids per unit volume), $\Delta L$ is the difference in the size range between $L_1$ and $L_2$, $k_v$ is the particle shape factor, ρ is the particle density, and $\bar{L}$ is the arithmetic mean of $L_1$ and $L_2$.

Figure 6:
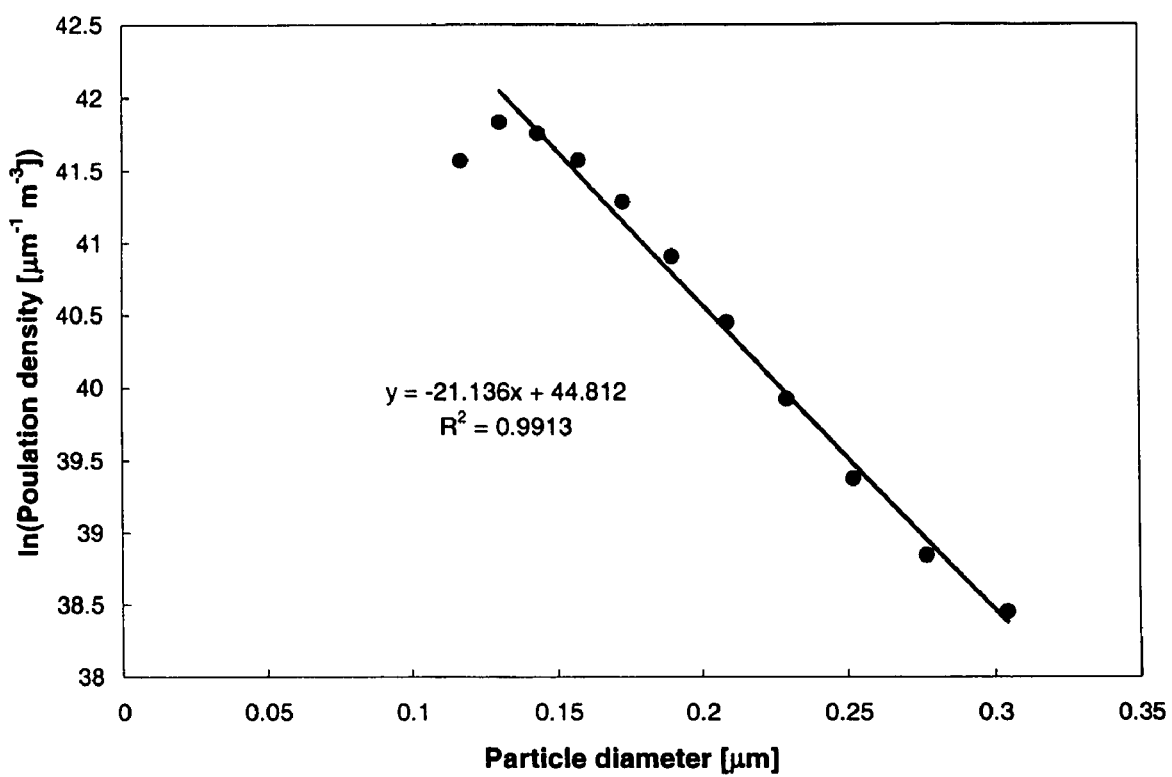
FIG. 6 shows experimental data for population data as a function of particle diameter for PLA particles.

Using equation 3.0 the particle growth rate is calculated to be 394 µm s$^{-1}$, and using equation 4.0 the particle nucleation rate is calculated to be $1.1 \times 10^{22}$ m$^{-3}$ s$^{-1}$. FIG. 6 shows experimental data for population data as a function of particle diameter for experiments conducted with the 0.07 microliter mixing chamber. The same precipitation experiment was peformed three times, and the results averaged to determine the nulceation and growth rates. Calculations show nucleation rates are $\ln(I_o)$=53+/−3.0 m$^{-3}$ s$^{-1}$ and particle growth rates of 280+/−112 µm s$^{-1}$.

Effect of Mixing Power on PLA Particle Diameter During the PCA Process

In high Reynold's number flows mean velocity gradients generate vortical structures called eddies. The largest eddies have a length scale comparable to the width of the shear flow and consume energy from the mean flow field by stretching. This energy is transferred from one length scale to the next, but at some point the eddies become so thin that the time scale for molecular diffusion is sufficiently short to smear out gradients by viscous diffusion. Because molecular diffusion only contributes to the fluid behavior at the smallest length scales, called Kolmogorov microscales, these are believed to dominate the supersaturation level in a two fluid mixing system and thus particle size. Kolmogorov microscales (η) can be manipulated through changes in kinematic viscosity (ν) and energy dissipation rate (ε), which can also be interpreted as mixing power.

$$\eta \approx \left(\frac{v^3}{\varepsilon}\right)^{0.25}$$

Figure 7:
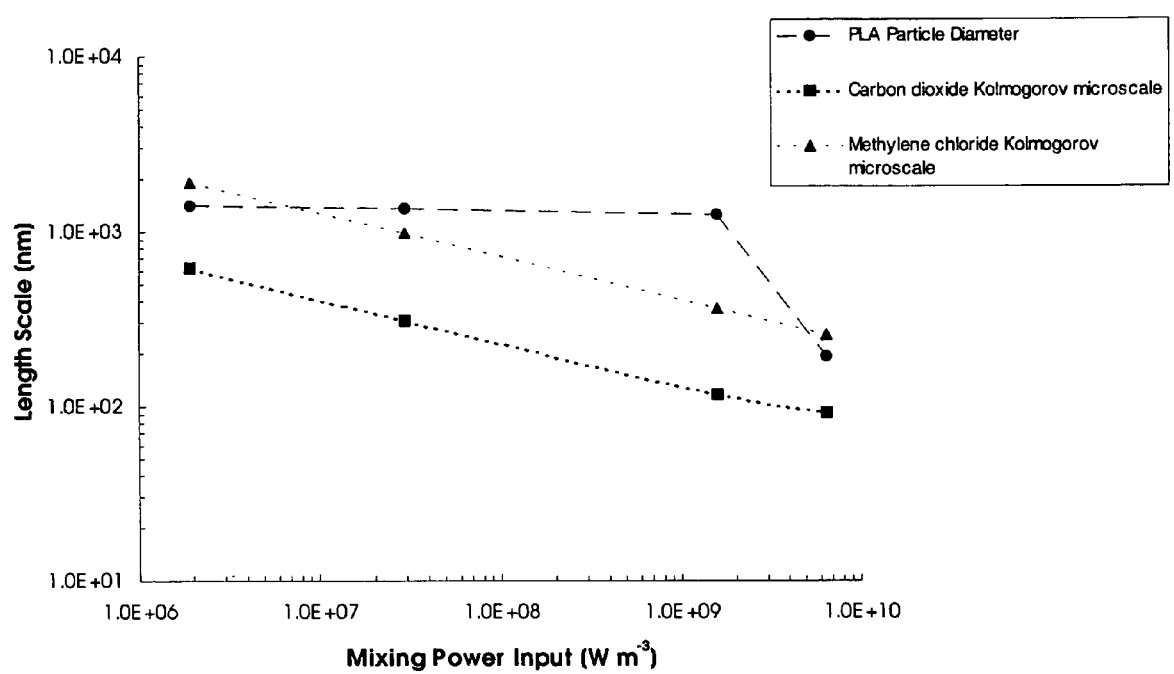
FIG. 7 shows the calculated relationship between Kolmogorov microscales and mixing power for carbon dioxide and methylene chloride compared with the experimentally measured relationship between particle size and mixing power for PLA particles.

FIG. 7 shows the calculated relationship between Kolmogorov microscales and mixing power for carbon dioxide and methylene chloride compared with the experimentally measured relationship between particle size and mixing power for PLA particles.

Preparation of Sodium Chloride and Mannitol Particles with the CAN-BD Process

Figure 8:
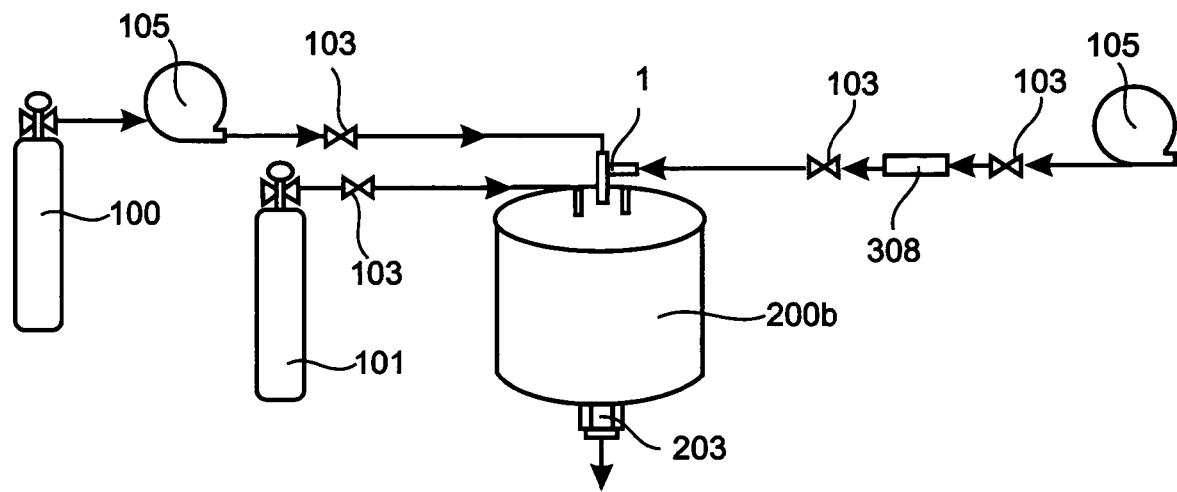
FIG. 8 schematically illustrates a CAN-BD apparatus used to form particles.

Standard grade carbon dioxide and nitrogen (99% pure) were purchased from Airgas (Boulder, Colo.), sodium chloride was purchased from Fischer Scientific (Pittsburgh, Pa.), and mannitol was purchased from Pfanstiehl Laboratories Inc. (Waukegan, Ill.). The apparatus used to perform the CAN-BD process is shown in FIG. 8. The jet-swirl nozzle was configured with a 0.07 μL mixing volume for all experimental runs. De-ionized water was loaded into an ISCO model 500D syringe pump (105) and the pump was set to deliver a constant flow rate. Carbon dioxide was fed into a second ISCO model 500D syringe pump (105), and the pump was set to deliver $CO_2$ at a constant pressure of 8.3 MPa. A premixed 10 wt % aqueous solution of mannitol or sodium chloride was loaded into a 50 mL stainless steel vessel (308) (Thar Technologies Inc., Pittsburgh, Pa.), and the vessel was placed inline with the aqueous pump. A run began by pumping a stream of $CO_2$ (T~25° C., P=8.3 MPa, flow rate ~23 mL min$^{-1}$) and an aqueous stream (T~25° C., P=8.3 MPa, flow rate=1.0-3.0 mL min$^{-1}$) to the jet-swirl nozzle where the two streams were intimately mixed. The rapid decompression of the $CO_2$ as it exited the nozzle, coupled with the explosive release of dissolved $CO_2$ from the aqueous solution, atomized the aqueous solution and produced an aerosol. The aerosol was sprayed into a 60 L stainless steel drying chamber (200b) fitted with a gas inlet port at the top of the chamber, and a powder collection apparatus (203) at the bottom. The pressure in the drying chamber was near ambient pressure (~0.082 MPa in Boulder, Colo.). Heated, dry nitrogen at a flow rate of ~18 L min$^{-1}$ was added from cylinder (101) concurrently with the aerosol through the gas inlet port. The temperature inside the drying chamber was maintained at 60° C. Mannitol was sprayed with an aqueous flow rate of 3.0 mL min$^{-1}$ and sodium chloride with a flow rate of 1.0 mL min$^{-1}$. Samples of the dry powders for SEM characterization were collected from the filter paper.

Mannitol and Sodium Chloride Particle Characterization

Mannitol and sodium chloride particle samples were analyzed with a scanning electron microscope (SEM) to estimate particle size and determine particle morphology. A SEM (model ISI-SX-30) was used to analyze the particles. Samples were prepared for SEM analysis by mounting a piece of double-stick carbon tape on an aluminum stub and then placing a portion of the sample on the tape. The samples were sputter coated with gold and then imaged.

Figure 9:
FIG. 9 shows a SEM image of mannitol particles formed with a CAN-BD process.
Figure 10:
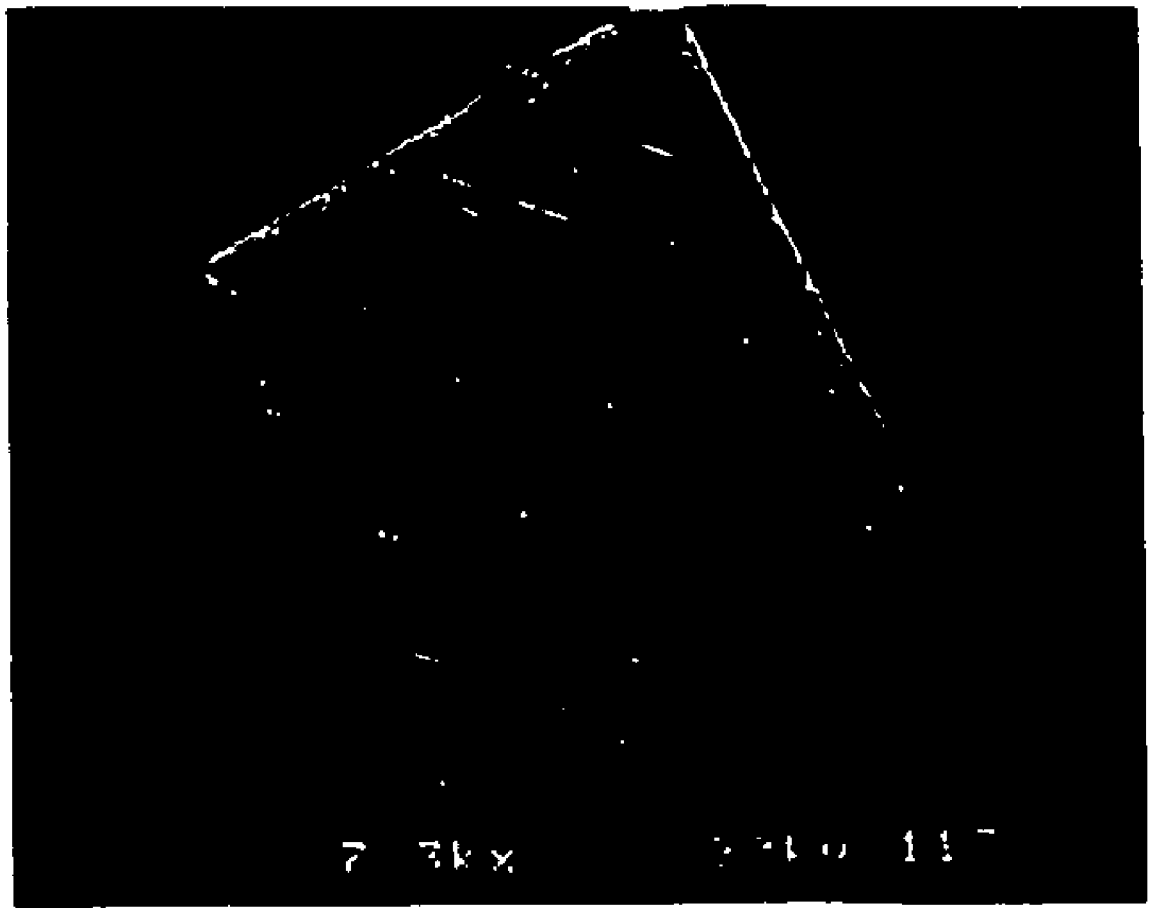
FIG. 10 shows a SEM image of sodium chloride particles formed with a CAN-BD process.

SEM micrographs of the particles produced using the jet-swirl nozzle in conjunction with the CAN-BD process are shown in FIGS. 9 and 10. In FIGS. 9 and 10, the second bar on the right at the bottom of the micrograph represents a one micron scale. The mannitol particles (FIG. 9) had the same characteristic size and morphology as those produced using a 75 μm restrictor with the CAN-BD process (Sievers et al. (2002) in Proceedings for the 8$^{th}$ Meeting on Supercritical Fluids, Bordeaux, France, pp. 17). However, the sodium chloride particles had different sizes and morphologies relative to those reported in the literature (Sievers et al. (2002) supra). Typically, hollow clusters of sodium chloride particles with a diameter of 1-3 μm are observed. As shown in FIG. 10, single cubic crystals of sodium chloride were observed that have a diameter of ~12 μm. In addition, particles with an "interlocking" cubic morphology with a diameter of ~8 μm were observed.

TABLE 1

Characteristic dimensions of the swirl inserts and cap ends. The power input into the swirl chamber is based on head loss due to $CO_2$ flow.

| Swirl insert tip diameter [μm] | Inlet orifice diameter [μm] | Exit orifice diameter [μm] | Swirl chamber volume [μL] | Power input [W/m³] |
|---|---|---|---|---|
| 3100 | 876 | 343 | 4.0 | $1.9 \times 10^6$ |
| 1118 | 737 | 343 | 0.24 | $3.0 \times 10^7$ |
| 800 | 300 | 343 | 0.13 | $1.6 \times 10^9$ |
| 800 | 300 | 100 | 0.07 | $6.5 \times 10^9$ |

TABLE 2

Average Particle Diameter and Polydispersity for PLA Particles

| Swirl chamber volume [μL] | Volume Weighted Average Diameter [μm] | Polydispersity |
|---|---|---|
| 4.0 | 1.43 +/− 0.09 | 1.6 |
| 0.24 | 1.35 +/− 0.14 | 1.4 |
| 0.13 | 1.24 +/− 0.04 | 1.5 |
| 0.07 | 0.193 +/− 0.022 | 1.1 |

We claim:

1. A method for producing particles having a diameter less than about 15 microns comprising the steps of:
    mixing a first fluid and a second fluid in a mixing chamber of a nozzle, wherein mixing occurs through interaction of at least one first fluid jet and at least one second fluid jet in the mixing chamber and at least one of the jets is a swirling jet;
    providing into the nozzle power per unit volume above about $1.9 \times 10^6$ W/m³; and
    spraying the mixed first and second fluids through an outlet into the chamber of an apparatus for forming particles,
    wherein the first fluid is selected from the group comprising a supercritical fluid and a near-supercritical fluid and the second fluid is a solution comprising a solvent and a solute.

2. The method of claim 1, wherein the second fluid jet is the swirling jet.

3. The method of claim 1, wherein the particles have a size distribution so that the polydispersity is less than about 1.75.

4. The method of claim 1, wherein the particles have an average diameter less than about 1 micron.

5. The method of claim 4, wherein the particles have a size distribution so that the polydispersity is less than about 1.5.

6. The method of claim 1, wherein the power input into the nozzle is above about $6.5 \times 10^9$ W/m³.

7. The method of claim 1, wherein the particles are polymer particles.

8. The method of claim 7, wherein the solution further comprises a bioactive ingredient.

9. The method of claim 1, wherein the supercritical or near supercritical fluid is $CO_2$.

10. The method of claim 1, wherein the apparatus for forming particles is a PCA apparatus.

11. The method of claim 10, wherein the solvent is non-aqueous.

12. The method of claim 1, wherein the apparatus for forming particles is a CAN-BD apparatus.

13. The method of claim 12, wherein the solvent is aqueous.

14. An apparatus for forming particles with an average diameter less than about 15 microns comprising:
- a particle formation chamber capable of maintaining a selected temperature and pressure;
- a nozzle for introducing a first fluid and a second fluid into the particle formation chamber, the nozzle capable of sustaining input power of at least about $1.9 \times 10^6$ W/m$^3$; and
- a power supply for providing power per unit volume above about $1.9 \times 10^6$ W/m$^3$ to the nozzle,
- wherein the nozzle has an axis
- and both the fluids flow through the nozzle so that each fluid has a component of flow parallel to the nozzle axis, and nozzle comprises the mixing chamber having interior walls, the walls having an angle with respect to the nozzle axis of less than 90° and an upper surface of the mixing chamber being formed by a swirl insert; at least a first and a second inlet to the mixing chamber, the first and second inlet being formed through the swirl insert; and at least one outlet from the mixing chamber, wherein at least the first inlet is a swirl inlet which is not parallel to the nozzle axis and the first fluid is selected from the group consisting of a supercritical and a near-supercritical fluid and the second fluid is a solution comprising a solvent and at least one solute.

15. The apparatus of claim 14, wherein the second inlet is an axial inlet.

16. The apparatus of claim 15, wherein the outlet is axial.

17. The apparatus of claim 15, wherein the ratio of the diameters of the second inlet to the outlet is between about 1:10 and about 10:1.

18. The apparatus of claim 15, wherein the ratio of the diameters of the second inlet to the outlet is between about 1:2 and about 2:1.

19. An apparatus for forming particles with an average diameter less than about 15 microns comprising:
- a particle formation chamber capable of maintaining a selected temperature and pressure;
- a nozzle for introducing a first fluid and a second fluid into the particle formation chamber, the nozzle capable of sustaining input power of at least about $1.9 \times 10^6$ W/m$^3$; and a power supply for providing power per unit volume above about $1.9 \times 10^6$ W/m$^3$ to the nozzle,
- wherein the nozzle has an axis
- and both the first fluid and the second fluid flow through the nozzle so that each fluid has a component of flow parallel to the nozzle axis and wherein the consisting of a supercritical and a near-supercritical fluid and the second fluid is a solution comprising a solvent and at least one solute.

20. The apparatus of claim 19, wherein the second inlet is an axial inlet.

21. The apparatus of claim 20, wherein the outlet is axial.

22. The apparatus of claim 20, wherein the ratio of the diameter of the second inlet to the diameter of the outlet is between about 1:10 and about 10:1.

23. The apparatus of claim 20, wherein the ratio of the diameter of the second inlet to the diameter of the outlet is between about 1:2 and about 2:1.

24. A nozzle for spraying a first fluid and a second fluid, the nozzle having an axis and comprising:
- a mixing chamber having interior walls, the interior walls capable of sustaining an input power of at least about $1.9 \times 10^6$ W/m$^3$;
- a first and second inlet to the mixing chamber; and
- at least one outlet from the mixing chamber,
- wherein both fluids flow through the nozzle so that each fluid has a component of flow parallel to the nozzle axis, at least the first inlet is a swirl inlet which is not parallel to the nozzle axis and the walls of the mixing chamber converge towards the outlet in the vicinity of the outlet and the first fluid is selected from the group
- wherein the nozzle comprises the mixing chamber having interior walls; at least a first and a second inlet to the mixing chamber; and at least one outlet from the mixing chamber, and
- wherein at least the first inlet is a swirl inlet which is not parallel to the nozzle axis and the walls of the mixing chamber converge towards the outlet in the vicinity of the outlet and the first fluid is selected from the group consisting of a supercritical and a near-supercritical fluid and the second fluid is a solution comprising a solvent and at least one solute.

25. A method for producing particles having a diameter less than about 15 microns comprising the steps of:
- mixing a first fluid and a second fluid in a mixing chamber of a nozzle, wherein mixing occurs through interaction of at least one first fluid jet and at least one second fluid jet in the mixing chamber and at least one of the jets is a swirling jet; and
- spraying the mixed first and second fluids through an outlet into the chamber of an apparatus for forming particles, the particles having a size distribution so that the polydispersity is less than about 1.75,
- wherein the first fluid is selected from the group comprising a supercritical fluid and a near-supercritical fluid and the second fluid is a solution comprising a solvent and a solute.

26. A method for producing particles having a diameter less than about 15 microns comprising the steps of:
- mixing a first fluid and a second fluid in a mixing chamber of a nozzle, wherein mixing occurs through interaction of at least one first fluid jet and at least one second fluid jet in the mixing chamber and at least one of the jets is a swirling jet; and
- spraying the mixed first and second fluids through an outlet into the chamber of an apparatus for forming particles, the particles having a size distribution so that the polydispersity is less than about 1.5,
- wherein the first fluid is selected from the group comprising a supercritical fluid and a near-supercritical fluid and the second fluid is a solution comprising a solvent and a solute.

* * * * *